(12) United States Patent
Meijer et al.

(10) Patent No.: US 7,873,592 B2
(45) Date of Patent: Jan. 18, 2011

(54) TYPE INFERENCE FOR OBJECT-ORIENTED LANGUAGES

(75) Inventors: Henricus Johannes Maria Meijer, Mercer Island, WA (US); Gavin Bierman, Cambrige (GB); Mads Torgersen, Issaquah, WA (US); Anders Hejlsberg, Seattle, WA (US); Danny Van Velzen, Redmond, WA (US); Peter A. Hallam, Seattle, WA (US); Robert Eric Lippert, Seattle, WA (US); Matthew J. Warren, Redmond, WA (US); Paul A. Vick, Seattle, WA (US); Amanda Silver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 803 days.

(21) Appl. No.: 11/737,892

(22) Filed: Apr. 20, 2007

(65) Prior Publication Data
US 2008/0262992 A1 Oct. 23, 2008

(51) Int. Cl.
- G06F 9/44 (2006.01)
- G06N 7/02 (2006.01)
- G06N 7/06 (2006.01)

(52) U.S. Cl. ................................................ 706/52
(58) Field of Classification Search ............ 706/51
See application file for complete search history.

(56) References Cited

U.S. PATENT DOCUMENTS

| | | | |
|---|---|---|---|
| 5,301,260 A | 4/1994 | Miyashita | |
| 5,748,966 A | 5/1998 | Sato | |
| 6,157,901 A | 12/2000 | Howe | |
| 6,202,202 B1 | 3/2001 | Steensgaard | |
| 7,047,447 B2 | 5/2006 | Cantrill | |
| 2004/0194058 A1 | 9/2004 | Meijer et al. | |
| 2005/0086639 A1 | 4/2005 | Min et al. | |
| 2006/0048095 A1 | 3/2006 | Meijer et al. | |
| 2006/0080641 A1 | 4/2006 | Taylor et al. | |
| 2006/0167880 A1 | 7/2006 | Meijer et al. | |

FOREIGN PATENT DOCUMENTS

WO  WO0106357 A1  1/2001

OTHER PUBLICATIONS

'A Lambda Calculus of Objects and Method Specialization': Mitchell, 1993, IEEE, 1043-6871, pp. 26-38.*
Milner, 'A theory of type polymorphism in programming':, 1978, journal of computer and system sciences 17, 348-375.*
Sutor, 'The type reference and coercion facilities in the scratchpad II interpreter':, ACM 0-89791-235, pp. 56-63.*
Wang, et al. "Precise Constraint-Based Type Inference for Java", http://www.cs.jhu.edu/~scott/pll/papers/ecoop01.pdf, Department of Computer Science, The Johns Hopkins University, last accessed Feb. 2, 2007, 19 pages, Baltimore, MD, USA.

(Continued)

*Primary Examiner*—Donald Sparks
*Assistant Examiner*—Peter Coughlan
(74) *Attorney, Agent, or Firm*—Workman Nydegger

(57) ABSTRACT

Systems and methods facilitate type inference in a computer-programming environment. Type inference can be applied to generic method or function invocation in object-oriented languages to determine a type argument list left implicit by a programmer. One or more type arguments can be identified as a parameter type to which all other types in a set of associated parameter types can be converted.

13 Claims, 18 Drawing Sheets

OTHER PUBLICATIONS

Agesen. "Concrete Type Inference: Delivering Object-Oriented Applications", Sun Microsystems Laboratories, http://research.sun.com/techrep/1996/smli_tr-96-52.pdf, Jan. 1996, Mountain View, CA, USA, last accessed Feb. 2, 2007, 187 pages.

Rapicault, et al. "Dynamic Type Inference to Support Object-Oriented Reengineering in Smalltalk", http://www.iam.unibe.ch/~scg/Archive/famoos/Rapi98a/type.pdf, last accessed Feb. 2, 2007, 5 pages, Sophia Antipolis, FR.

* cited by examiner

Object
Int: Unrestrained
Object: Unrestrained

TYPE INFERENCE FOR OBJECT-ORIENTED LANGUAGES

BACKGROUND

Computer programs are groups of instructions that describe actions to be performed by a computer or other processor-based device. When a computer program is loaded and executed on computer hardware, the computer will behave in a predetermined manner by following the instructions of the computer program. Accordingly, the computer becomes a specialized machine that performs tasks prescribed by the instructions.

A programmer using one or more programming languages creates the instructions comprising a computer program. Typically, source code is specified or edited by a programmer manually and/or with help of an integrated development environment (IDE). Subsequently, the source code can be compiled or otherwise transformed by another program into computer instructions executable by a computer or like device.

Compilers and/or interpreters are language translators that translate a high-level program code and to low-level machine code to facilitate programming. Compilers separate program translation from execution. Generally, compilers have two main segments, namely one to generate an internal program representation and another to generated code from the representation. The generated code is subsequently executable by a target machine or platform. Conversely, interpreters are tightly tied with execution. More specifically, interpreters translate source code for execution by a cross-platform virtual machine. A hybrid approach also exists wherein source code is compiled to intermediate language code that can be interpreted for virtual machine execution.

Compilers and/or interpreters can provide a variety of programmatic aid beyond code translation. In one instance, such aid can center on a language type system. A type system defines program behavior by how expressions, values and the like are classified into types and the interaction between types. Accordingly, type systems vary across programming languages. The compiler and/or interpreter can utilize the type system to perform many useful tasks including type checking and type inference, among other things. Type checking can identify programmatic errors as a function of types associated with data, for example statically or dynamically. This can provide a degree of program safety by detecting meaningless or likely invalid code. Type inference, conventionally applied by functional programming languages, automatically infers types thereby making programming tasks easier by allowing programmers to omit explicit type annotations while still maintaining type safety.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the disclosed subject matter pertains generally to type inference systems and methods. More particularly, type inference is described with respect to object-oriented generics including methods and functions, among others. Generic type arguments are determined from parameter types and/or other type information. In accordance with one aspect of the disclosure, a type argument can be determined from a set of associated parameter types by identifying a type in the set to which all other types convert. According to another aspect, annotations can be specified on parameter types identifying conversion constraints as a function of a language and/or position with respect to a constructed type, among other things. In accordance with yet another aspect, support is provided for implicitly typed lambda expression as method arguments.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are provided with respect to type inference in object-oriented languages. More particularly, the disclosure pertains to type inference with respect to generics (e.g., methods, classes, types . . . ). Various type inference mechanisms are described including a completeness condition and annotated types/substitutions. In addition, type inference including lambda expression parameters is confronted. Further yet, methods and mechanisms are provided for efficient type inference utilizing multiple phases or iterations, fixing of inferred types and type inference utilizing a dependency structure, among other things.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed.

Rather, the intention is to cover all modifications, equivalents and alternatives falling within the spirit and scope of the claimed subject matter.

Figure 1:
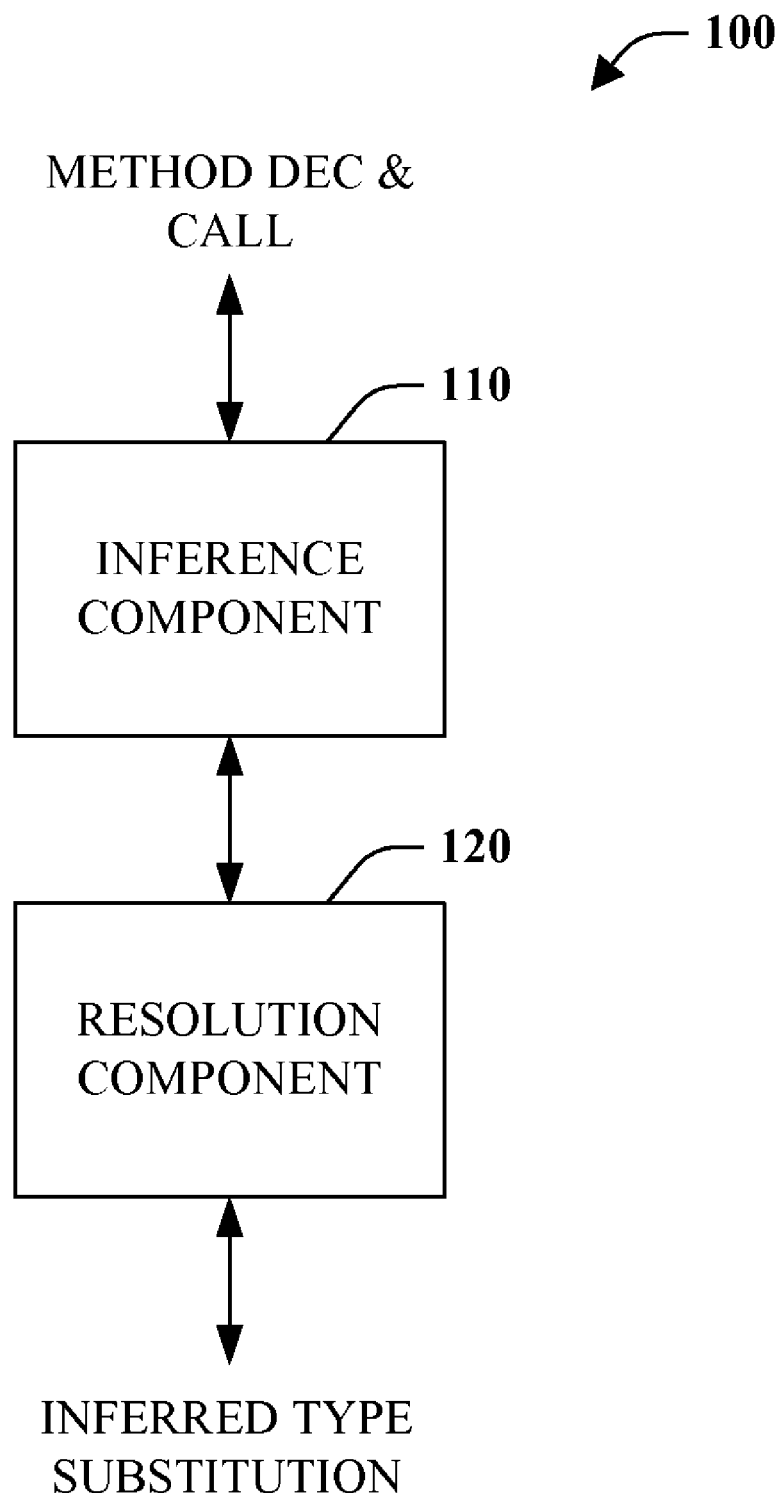
FIG. 1 is a block diagram of a type inference system in accordance with an aspect of the claimed subject matter.

Referring initially to FIG. 1, a type inference system 100 is illustrated in accordance with an aspect of the claimed subject matter. The system 100 facilitates type inference with respect to generics. More specifically, the system 100 is operable to infer, deduce or otherwise determine type arguments from invocations thereof. This helps make generic methods easy to use since they can be called without specifying type arguments. System 100 includes an inference component 110 and a resolution component 120 to perform such type inference.

The inference component 110 is a mechanism for determining via inference or otherwise types associated with one or more method call arguments or parameters. Once a method declaration and call or invocation is received, retrieved or otherwise identified or acquired, the inference component 110 can begin to identify types associated with the arguments/parameters. As a simple example, "17" can be identified as type integer and "hello" of type string. More complicated arguments such as lambda expressions can also be employed as will be described further infra. Further, although types need not be specified, the inference component 110 can also accept and utilized explicit types at least as type hints. In some instances, conventional type inference mechanisms or algorithms can be utilized to infer certain types. However, such mechanisms can also be augmented or replaced by those provided hereinafter.

The resolution component 120 can determine a type argument (e.g., instantiation of a type parameter) from one or more associated parameters or other types. Parameter types can be received, retrieved or otherwise acquired from the communicatively coupled inference component 110. Thereafter, the parameter types and optionally other types can be employed by the resolution component 120 to identify one or more type argument types and/or substitutions representative of a mapping from type parameter to determined type.

The presence of type inference allows a more convenient syntax to be utilized for calling a generic method and allows a programmer to avoid specifying redundant type information. Consider the following method declaration, for example:

```
class Chooser {
    static Random rand = new Random( );
    public static T Choose<T>(T first, T second) {
        return (rand.Next(2) == 0)? first: second;
    }
}
```

Given this declaration, it is possible to invoke the Choose method without explicitly specifying a type argument:

```
//Calls Choose<int>
int i = Chooser.Choose(5, 213);
//Calls Choose<string>
string s = Chooser.Choose("foo", "bar");
```

Through type inference provided by system 100, the type arguments int and string can be determined from the arguments to the method and utilized to identify respective types or substitutions for type parameter <T>. Type inference can occur as part of compile type processing of a method invocation prior to an overload resolution step of the invocation.

When a particular method group is specified in a method invocation, and no type arguments are specified as part of the method invocation, type inference can be applied to each generic method in the method group. If type inference succeeds, then the inferred type arguments can be used to determine the types of arguments for subsequent overload resolution. If overload resolution chooses a generic method as the one to invoke, then the inferred type arguments are used as the actual type arguments for the invocation.

If type inference for a particular method fails, that method does not participate in overload resolution. The failure of type inference, in and of itself, does not cause a compile-time error. However, it can lead to a compile-time error when overload resolution then fails to find any applicable methods.

Slightly more precisely, given a method declaration:

$$T_r M<X_1 \ldots X_n>(T_1 x_1 \ldots T_m x_m)\{ \ldots \}$$

and a call:

$$M(e_1 \ldots e_m)$$

the task of type inference is to find type arguments $S_1 \ldots S_n$ with which the following call becomes valid:

$$M<S_1 \ldots S_n>(e_1 \ldots e_m)$$

Type inference can try to match the call of M to this declaration of M by inferring type arguments for each of the type parameters $X_1 \ldots X_n$.

Type inference can be applied to all method arguments and, assuming that all have been successful, the inferences can be pooled for later employment. Type inference can be said to have succeeded for the given generic method and argument list if both of the following are true:

Each type parameter of the method had a type argument inferred for it (in short, the set of inferences is complete).

For each type parameter, all of the inferences for that type parameter infer the same type argument (in short, the set of inferences is consistent).

However, this consistency requirement can be quite restrictive. Consider the following:

```
// Fails type inference
Chooser.Choice(42, new object( ));
// Succeeds
Chooser.Choice<object>(42, new object( ));
```

The type inference process rejects the first invocation as the two inferences for the type parameter T are not identical (int and object). The second invocation demonstrates that there is a valid type argument, namely object.

The problem with the inference of the types in the example above is that the inference mechanism prematurely infers type int for T. That is, after it sees the first argument 42 of type int, it locks T to int. In accordance with an aspect of the claimed subject matter, a better approach delays the choice until all inferences for T are made, and then selects the best type, namely the type in the set of types to which all others convert. In this case, that would be object. Such an approach can be utilized in connection with early and/or late binding.

Accordingly, the type inference component 110 can infer argument types and pool or collect the types for each type parameter. The resolution component 120 can subsequently select the best type from the set of types associated with each type variable. If all pools can be resolved, then the set of inferences can be said to be consistent and type inference successful if the completeness condition is also true.

In some cases, however, the completeness requirement can be too strong. Recall the completeness requirement states that each type parameter of the method has a type inferred for it. Consider the following:

```
class Test2
{
    public static List<X> null<X>( ){...};
}
```

Consider also the following assignment:

List<int> ints=Test2.null( ); //FAILS

This fails the completeness condition for type inference as only method arguments are considered whilst generating type inferences, so an inference for X cannot be determined under this condition.

Such a situation can be remedied by loosening the completeness condition to allow analysis of other information associated with a method call. In this case, the expected return type of a method invocation can be injected into the type inference process. In the above example, when the invocation expression Test2.null( ) is checked against the type List<int>, following the processing of the type inferences resulting from the arguments, inferences returning from matching the expected return type (List<int>) against the return type of the method (List<X>) can be added before a check for completeness performed. In this example, inference component system 100 would infer the type argument <int>.

Figure 2:
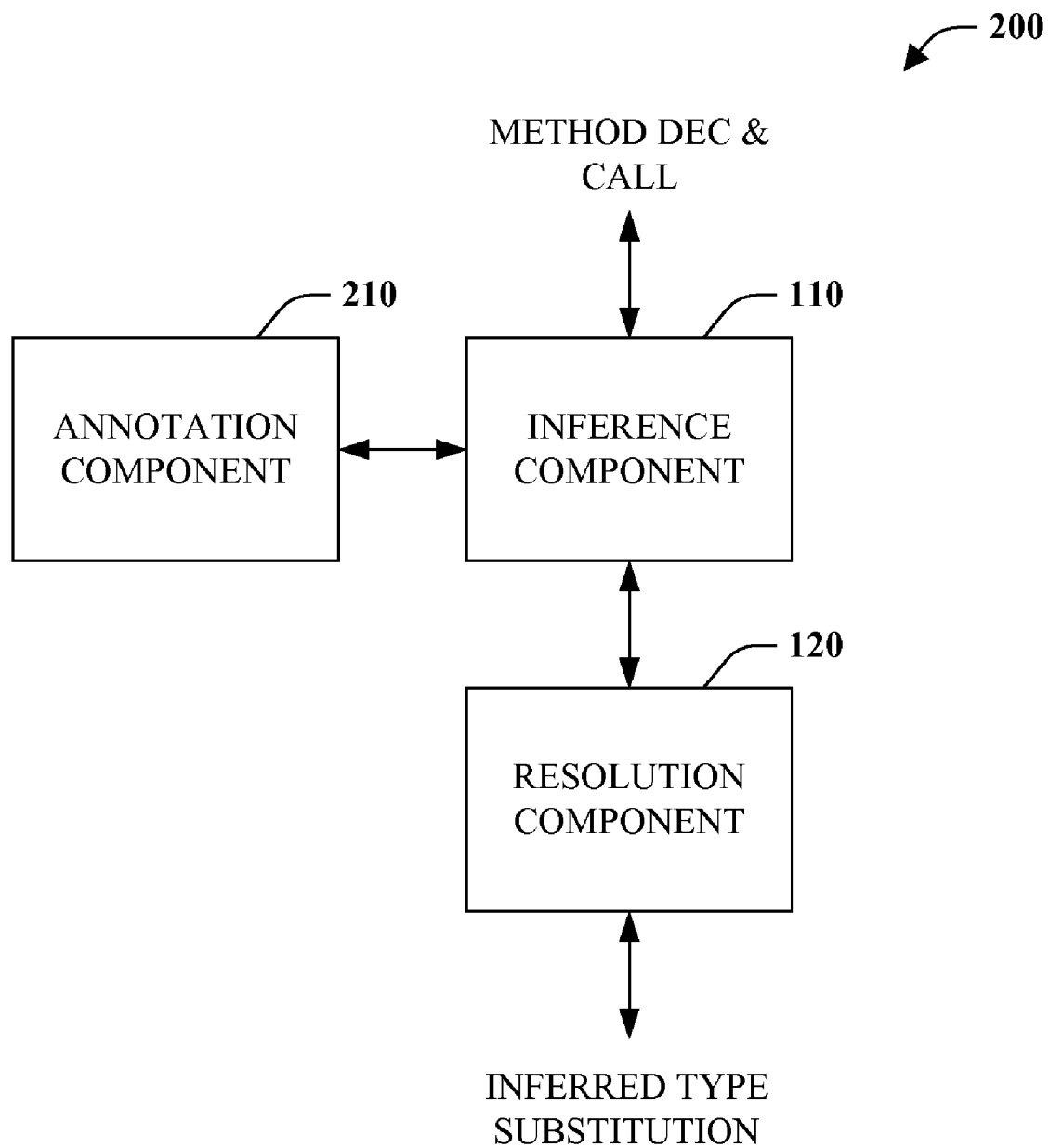
FIG. 2 is a block diagram of a representative constrained type inference system.

Referring to FIG. 2, a constrained type inference system 200 is illustrated. Similar to system 100 of FIG. 1, system 200 includes the inference component 110 and the resolution component 120, as previously described. System 200 also includes annotation component 210 communicatively coupled to the inference component 110. The annotation component 210 annotates an inferred type with constraints associated a programming language (e.g., VB, C#, Java . . .), mode thereof (e.g., option strict) or other programmer specified constraints and/or constructed types, for example. This annotation can then be utilized when determining the best type or the type to which all others convert. The annotation can in essence act to restrict the conversions considered when determining the best type. Among other things, this can further ensure that proper types are being inferred.

Consider the following method signatures in conjunction with subsequent invocations:

```
void m1<X>(X arg1, X arg2);
void m2<X>(X arg1, list<X> arg2);
void m3<X>(list<X> arg1, list<X> arg2);
void m4<X>(list<X> arg1, X arg2, X arg3);
m1(42, new object( ));    //Infers <object>
m2(42, "hello");          //Fails- no best type
```

However, this can be too expressive in certain cases. For example, the following invocation succeeds when it should not:

m3(new List<int>( ), new List<object>( )); //Should not work

As it stands, the type inference component 110 would infer the type argument <object>. The problem is that List is a constructed type that is invariant. The annotation component 210 provides the solution to this quagmire by recording whether the type or substitution applies to a type variable that is in a position where a conversion can apply, such as in top level of a method signature or inside a constructed type. Target types can be annotated accordingly. By way of example and not limitation, annotations can take the form $\{X \to \tau^\alpha\}$, where X is a type variable, $\tau$ is a type, and $\alpha$ is an annotation such as "<:" for a convertible type or substitution (e.g., covariant, contravariant) or "=" for an equality type or substitution (e.g., invariant).

Consider the following invocation:

m1(42, new object( )); //Suceeds

Here, the substitution $\{X \to \{int^{<:}, object^{<:}\}\}$ is generated. The modified consistency rule is that if there are only convertible substitutions then they can be resolved by finding the single best type. Stated differently, there is no restriction on conversion when trying to find the best type. In this case, the best type is object, so the inference process succeeds.

Consider the following:

m3(new List<int>( ), new List<object>( )); //Fails

Now the substitution generated is $\{X \to \{int^=, object^=\}\}$. The modified consistency rule is that equality substitutions must be equal. In other words, no conversion is allowed and the types must be the same. Hence, this invocation fails the type inference process.

Consider also the following:

m2(42, new List<object>( ));

In this case, the substitution $\{X \to \{int^{<:}, object^=\}\}$ is inferred (e.g., a convertible and an equality substitution). The modified consistency rule is that convertible target types must all be convertible to a single equality target type. The subject example then succeeds as int converts to object. Accordingly, the type argument <object> is inferred.

Furthermore, it is to be noted that arrays are only covariant for reference types. This complicates the inference process slightly. In this case a different annotation for the target type of a substitution can be added "°," which denotes a covariant substitution. For example consider the following method signatures:

void m5<X>(X[ ] arg1, X[ ] arg2;

Consider also the following invocation:

m5(new string[ ]{ }, new object[ ]{ });

The substitution can be inferred as $\{X \to \{string°, object°\}\}$. The consistency rule can be modified to first process covariant substitutions. If, as above, covariant substitutions are generated whose target types are all reference types, then they can be rewritten as convertible substitutions and continue as described supra. Hence, this invocation would succeed and the type <object> inferred.

Figure 3:
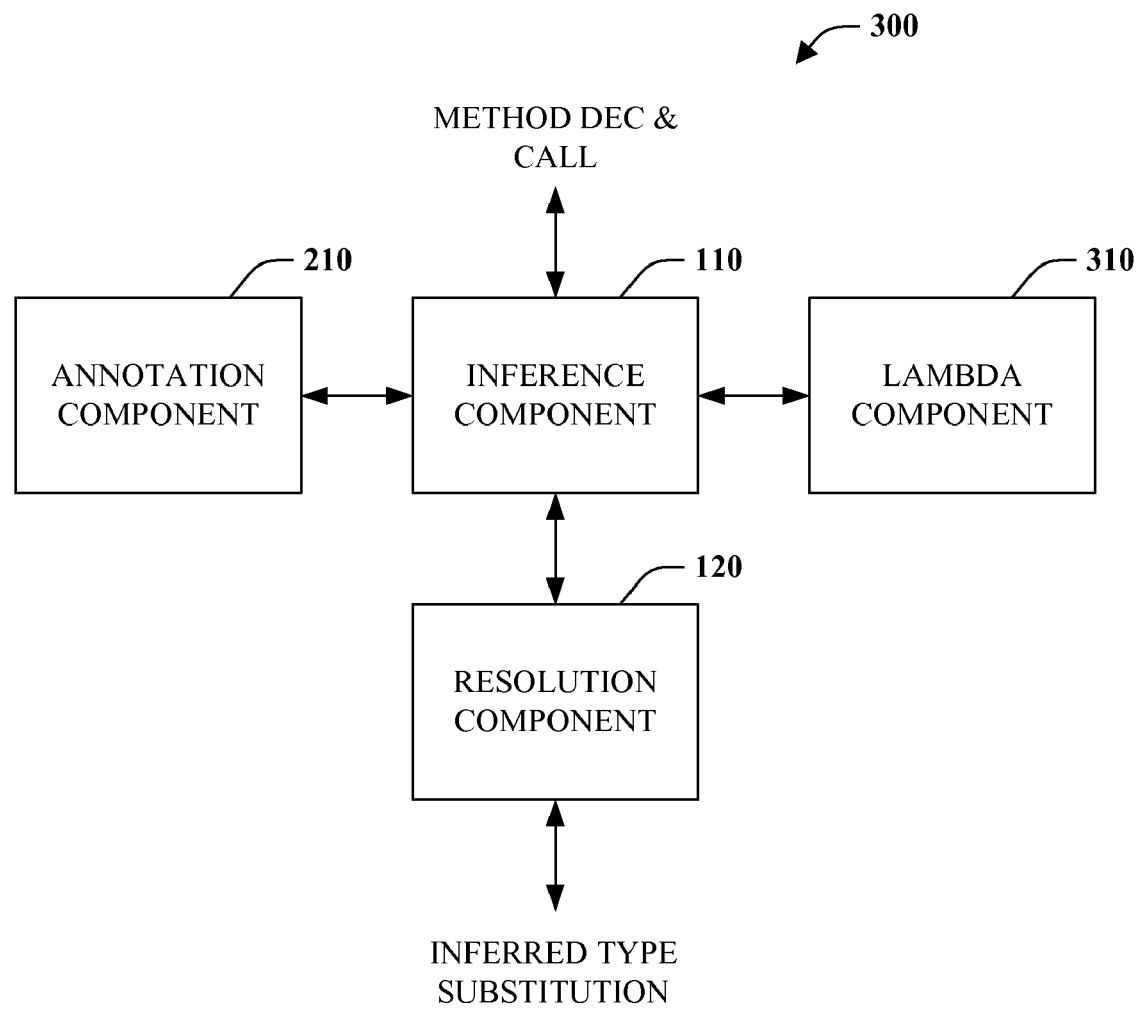
FIG. 3 is a block diagram of a representative type inference system that supports lambda expressions.

However, consider the following invocation:

m5(new int[ ]{ }, new object[ ]{});

The inferred substitution is $\{X \to \{in°, object°\}\}$. Here, covariant substitutions have been generated where one of the target types is a value type. In this case, all covariant substitutions are rewritten as equality substitutions, as no conver sion exists here. Hence, the subject invocation would fail type inference. Likewise, the following invocation would also fail:

m5(new sbyte[ ]{ }, new byte[ ]);

However, the following would succeed and infer type <int>:

m5(new int[ ]{ }, new int[ ]{ });

Referring to FIG. 3, a type inference system 300 that supports lambda expressions is depicted. Similar to system 200 of FIG. 2, system 300 includes the type inference component 110, resolution component 120 and annotation component 210, as previously described. Furthermore, the system 300 includes lambda component 310 coupled to the type inference component 110. Lambda component 310 provides added functionality to support type inference when lambda expressions are included as method arguments.

A lambda expression can be written (A x)=>e, where the argument type is explicit or (x)=>e, where the argument type is implicit. Whilst lambda expressions are essentially lightweight syntax for anonymous method expressions, lambda expressions when passed as arguments to a generic method participate in the type inference process.

However, the introduction of lambda expressions introduces an extra layer of dependencies between actual arguments and inferred types. A problem exists where there is a lambda expression and nothing is said about the type of the argument. A lambda expression can match against a delegate type, but the delegate argument type is also open. At this point, no progress can be made. This can be fixed by making several passes or iterations over arguments to method invocations. This can be driven by the lambda component 310 and/or the inference component 110. By way of example, if there is a lambda expression and no progress can be made with respect to inferring at type, the type inference process can defer for that round and make a pass through all other arguments to collect information about an input. The least amount of input can then be fixed in order to make some progress on the lambda expression. This can be repeated until all types for type arguments are determined or failure is conceded for lack of progress.

By way of example, consider the following method signature and expression:

void m10<X,Y,Z>(Func<X,Y> arg1, Func<Y,Z> arg2, X arg3);

m10((x)=>x, (y)=>y, 42);

In the first phase of type inference, the first and second arguments do not contribute substitutions, as their argument types are open. The third argument contributes the substitution {X→int}. In phase two, this substitution can be applied and so the first parameter type becomes Func<int, Y>. This produces the substitution {Y→int} in view of the lambda expression (x)=>x. The second argument does not contribute a substitution to phase two. In phase three, the substitution is applied so the second parameter type becomes Func<int, Z>. Interpreted in light of the lambda expression (y)=>y, the substitution {Z→int} is produced and the type inference process succeeds producing the type argument list <int, int, int>.

It is to be appreciated that the same or similar approach can be employed for any mechanisms similar to lambda expressions, for example that include a layer of indirection and/or dependencies. In accordance with one aspect of the disclosure, such an iterative approach can be embodied more concretely with respect to a dependency graph or other structure.

Figure 4:
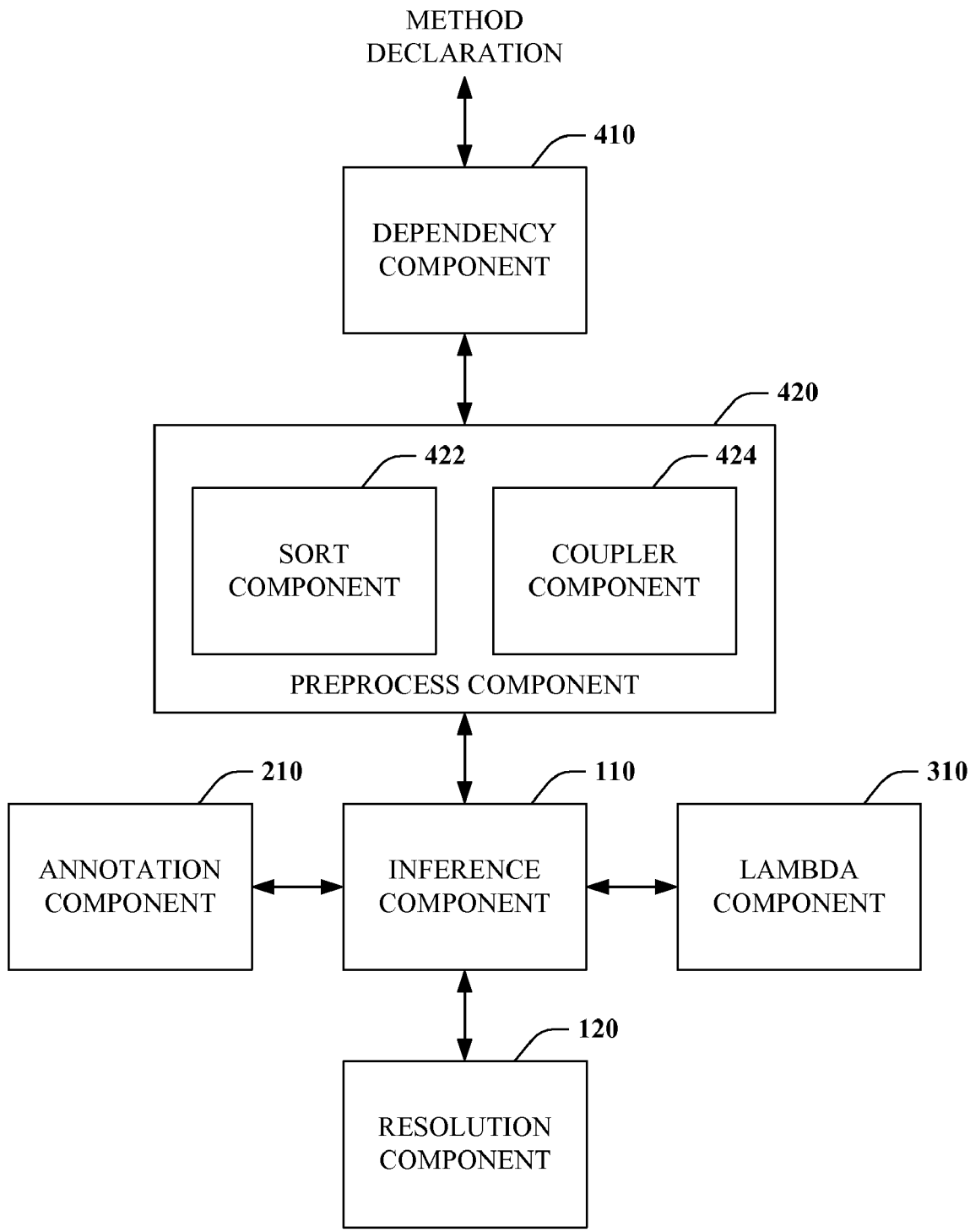
FIG. 4 is a block diagram of a representative type inference system that employs a dependency structure to effect incremental type inference.

Turning attention to FIG. 4 a type inference system 400 employing a dependency structure is illustrated. In addition to the components previously described with respect to FIGS. 1-3, the type inference system 400 includes a dependency component 410 and a preprocess component 420. The dependency component 410 constructs a structure such as a dependency graph between argument types and type variables to capture dependencies or relationships amongst types and type variables in a method definition. This structure can then be employed to aid type inference.

The preprocess component 420 modifies the graph to facilitate analysis thereof. In particular, the preprocess component includes a sort component 422 and a coupler component 424. The sort component 422 can perform a topographical sort of a generated dependency graph to use thereof. The coupler component 424 can identify strongly connected components of the graph. As will be appreciated, a strongly coupled component can include a single node or a collection of more than one node related by dependency or within a cycle.

The inference component 110 can infer, deduce or otherwise determine method argument types utilizing the dependency structure. In particular, the structure can be traversed iteratively and edges between parameters and type variables labeled with inferred concrete types. Where a type variable has multiple edges the best one can be selected by resolution component 120 in accordance with a particular definition of best. A cyclic dependency can correspond to a point in which progress cannot be made, for example associated with a lambda expression. To break the cycle a minimal amount of types are fixed and the process can continue. In other words, types can be fixed and the type inference process can be performed recursively. This can be done for multiple cycles and/or embedded cycles such as cycles within cycles. Furthermore, it is to be noted that assertions can be made to remove a one or more cyclic dependencies to facilitate type inference.

Figure 5:
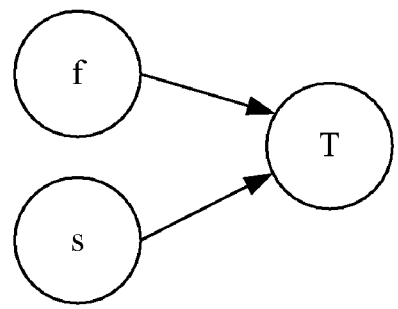
FIG. 5 illustrates representative dependency graphs associated with an example.
Figure 5:
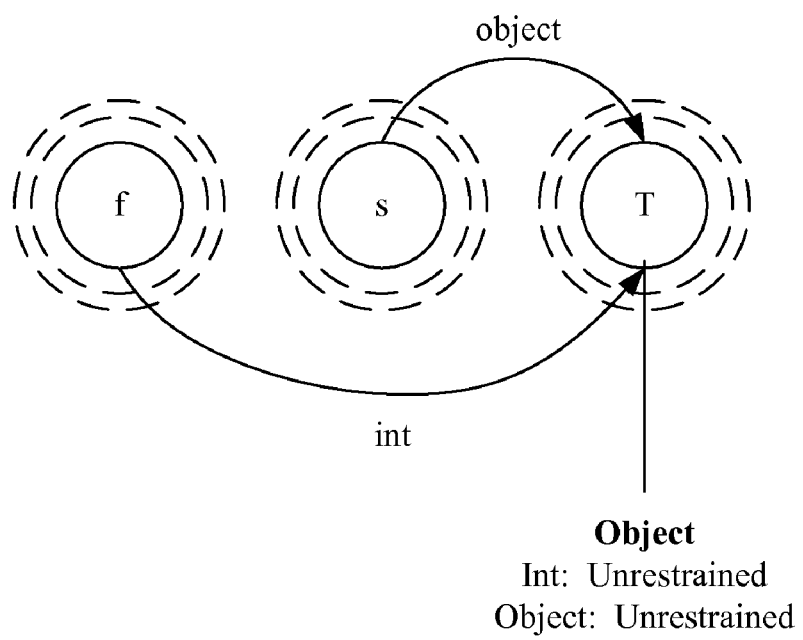

Turning to FIG. 5 two exemplary dependency graphs 510 and 520 are illustrated to aid understanding their use in incremental type inference. Consider the early chooser example with a method declaration and invocation as follows:

static T Choose<T>(T first, T second){ ... };

Choose(42, new object( ));

From the method declaration, dependency graph 510 can be generated. As shown, the graph 510 has three components, namely two types associated with the first and second arguments (f and s) and a single type variable T. Arrows from the arguments first and second to the type variable T indicate dependency.

Although this is a straightforward example, if the dependency graph 510 were to be preprocessed, dependency graph 520 would result. In this instance, graph 510 is topologically sorted to facilitate incremental or iterative type inference, here from left to right. In addition, since there are no cycles each node is a considered a strongly connected component identified graphically by circumscribing dashed lines.

The type variable T can be determined by working the graph utilizing the invocation. In particular, the first argument can be determined to be type integer and the second argument of type object. Type T can then be resolved by selecting the type to which all others convert. Absent any constraints on conversion, the type variable is identified as type object because integer converts to object.

As an example of a more complicated scenario including lambda expressions, consider the following method declaration and invocation:

```
void f<S,T,U>(S s, Func<S, U>g, T t, Func
    <T,U>h){...};

f(47, (s)=>s, new Object( ), (t)=>t);
```

Figure 6A:
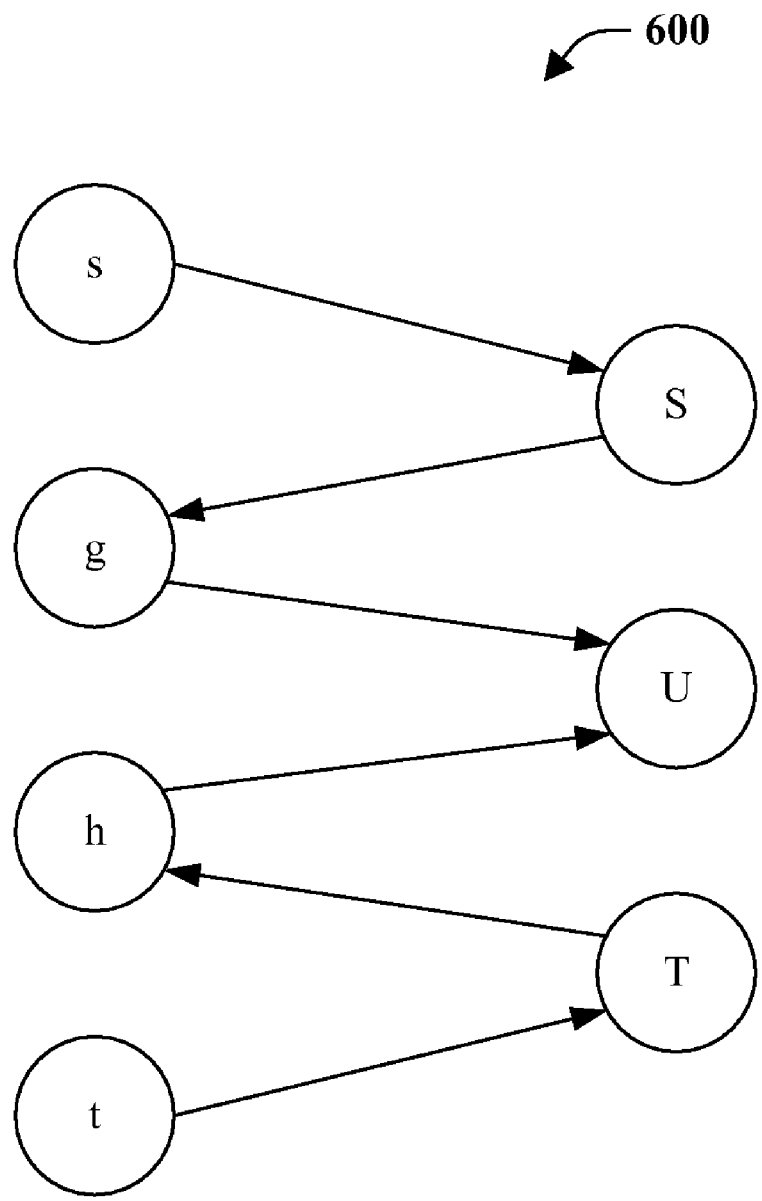
FIGS. 6a-b illustrate representative dependency graphs associated with another example.
Figure 6B:
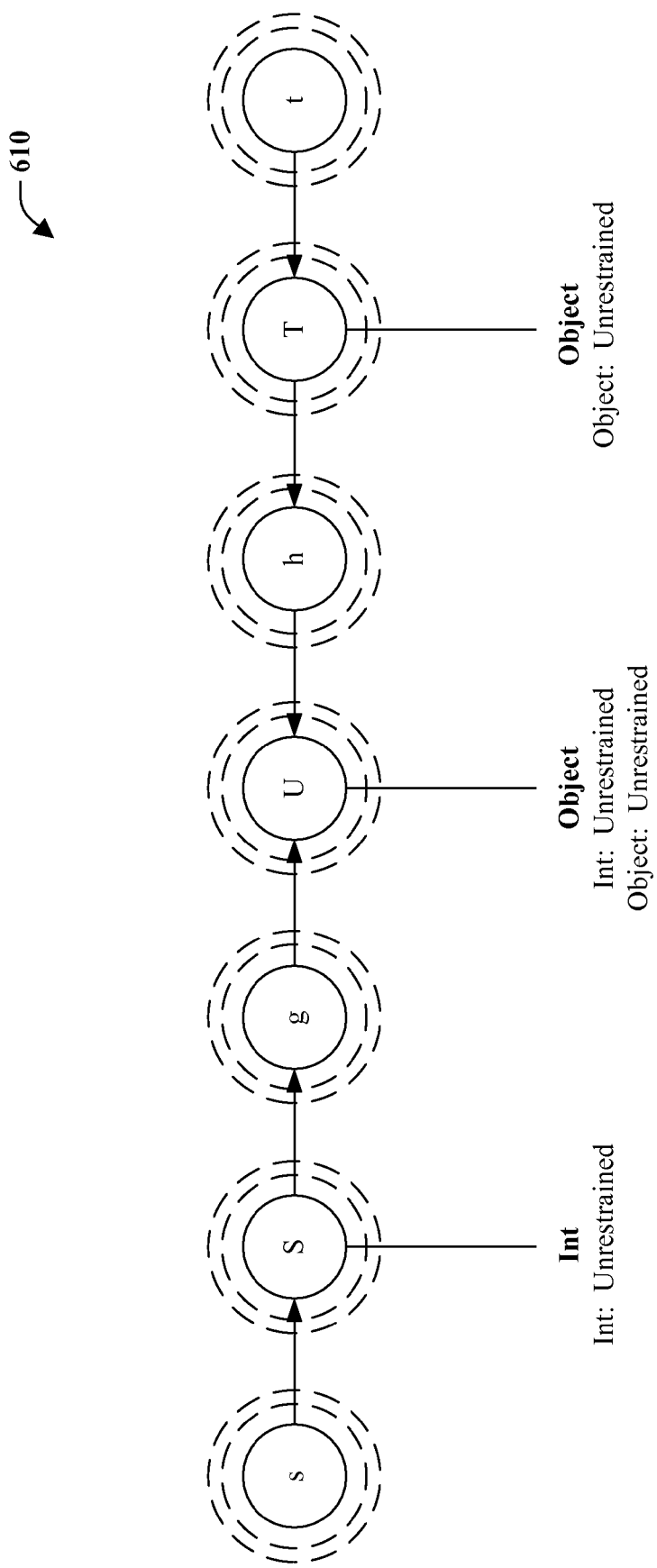

FIG. 6a illustrates dependency graph 600 that can be built from the method declaration. On the right side of the graph are the type variables S, T and U. On the right are type arguments to be inferred. Arrows connecting the type arguments to type variables identify dependencies. FIG. 6b illustrates a sorted dependency graph 610. Here, again each node is identified as a strongly connected component as no cycles are present despite introduction of lambda expressions.

Processing the graph iteratively utilizing the invocation works as follows: The first arrow on the right indicates that type variable S is dependent on the type of argument s (S s). Here, argument s is "47" which can be inferred to type integer or int. Moving from right to left, type variable U depends among other things on the type of argument g, which depends on the type of g since g is a function from S to U (Func<S, U>). Accordingly, type int can be ascribed to g and in turn to type U. This is appropriately verified by application to the lambda function (s)=>s, where the function takes an integer as input and returns an integer as output. However, type U cannot be determined as of yet since it includes two incoming arcs and only one has been determined.

Moving from right to left, T is of the same type of t (T t). The invocation indicates that t is "new Object( )." From that, T can be inferred to be of type object. Type variable U can also be determined to be of type object since type argument h receives an object and outputs an object (Func<T,U>). Again, this can be derived via the lambda expression (t)=>t, which takes an object and returns an object. At this point, the type of U can be resolved as all arrows have been determined as int and object. The type is resolved by selecting the type from the set of int and object to which all other types convert. Here, U is of type object because int converts to object. As a result, the type variables have been determined to be <int, object, object>.

It should be appreciated that using such a dependency structure is a concrete way to schedule an iterative process. In fact, type inference can be driven by the structure similar to a data flow or workflow process. Of course, this is only one approach to or implementation of incremental type inference. Other implementations are also possible (e.g., using constraints) and are to be deemed within the scope of the subject claims.

It should also be appreciated that in some cases, successful inference can depend on late binding or dynamic typing. For example, such a mechanism may be needed to enable a lambda expression type to be inferred.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers ...). Such components, inter alia, can automate certain mechanisms or processes performed thereby to make portions of the systems and methods more adaptive as well as efficient and intelligent. By way of example and not limitation, inference component 110 and/or resolution component 120 can employ such mechanism to infer, deduce or otherwise determine types.

In view of the exemplary systems described sura, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
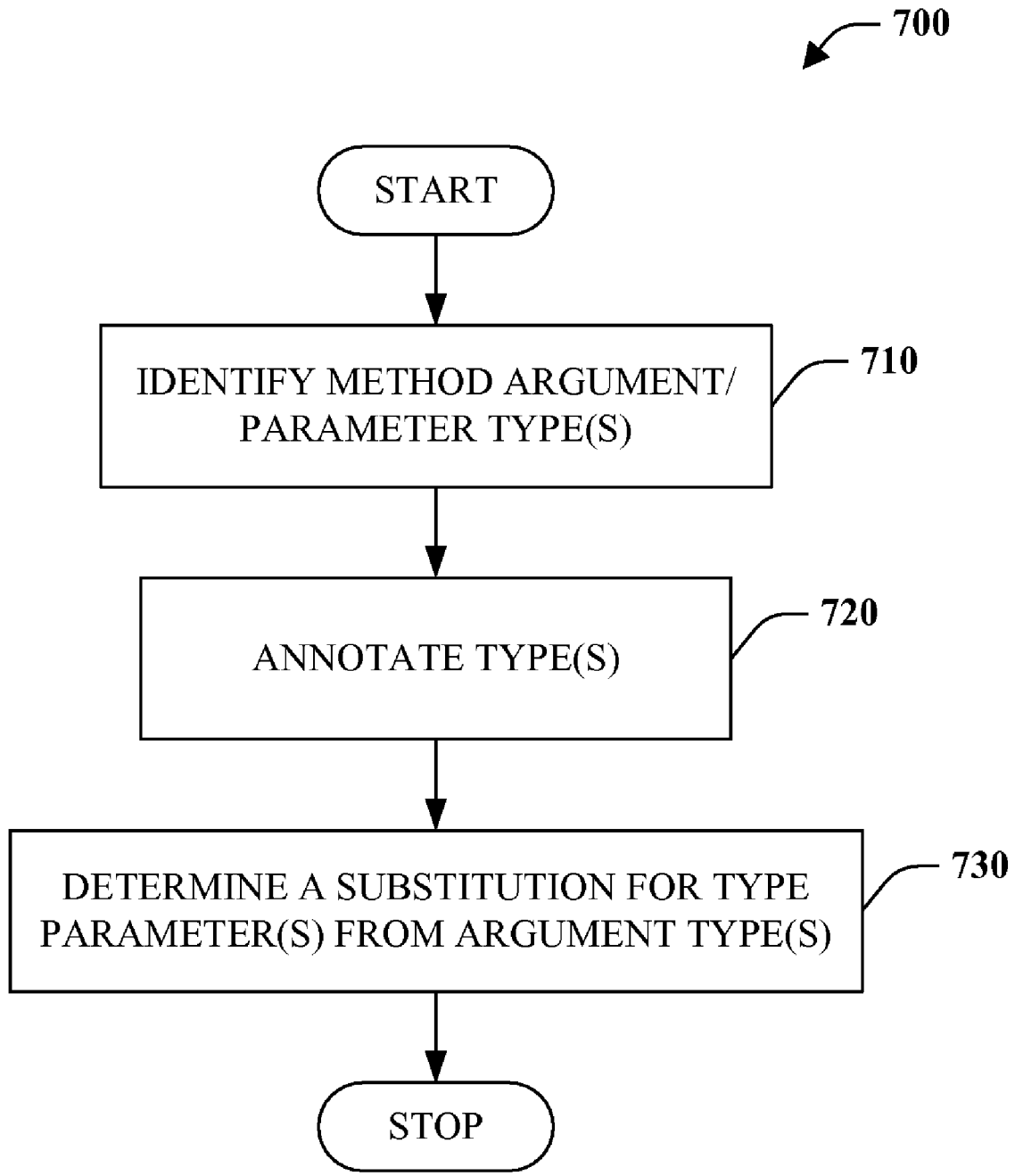
FIG. 7 is a flow chart diagram of a type inference method.

Referring to FIG. 7, a type inference method 700 is depicted for determining type arguments associated with generic methods, functions or the like. At reference numeral 710, method argument or parameter types are determined. For example, a type can be inferred or deduced from an argument and/or an explicit type identified.

Determined types are annotated with constraint information at reference numeral 720. Such information can identify appropriate or restricted type conversions, for example based on a language (e.g., C#, VB, Java ...), language mode (e.g., safe, unsafe), position with respect to a constructed type (e.g., array, list ...), among other things. For example, it can be determine and/or specified that a type must be a subtype of another type or implement a particular interface.

At reference 730, a type or substitution for a type parameter is determined from one or more determined types associated with a type parameter Where only one type is associated with a type parameter, that type can be selected. Otherwise, the type can be determined as one of the identified types to which all other types can convert. If no type exists, the inference can fail. Alternatively, a super type may be selected. It should also be appreciated that if no arguments exist, a type parameter can be selected from other type information such as a return type.

Figure 8:
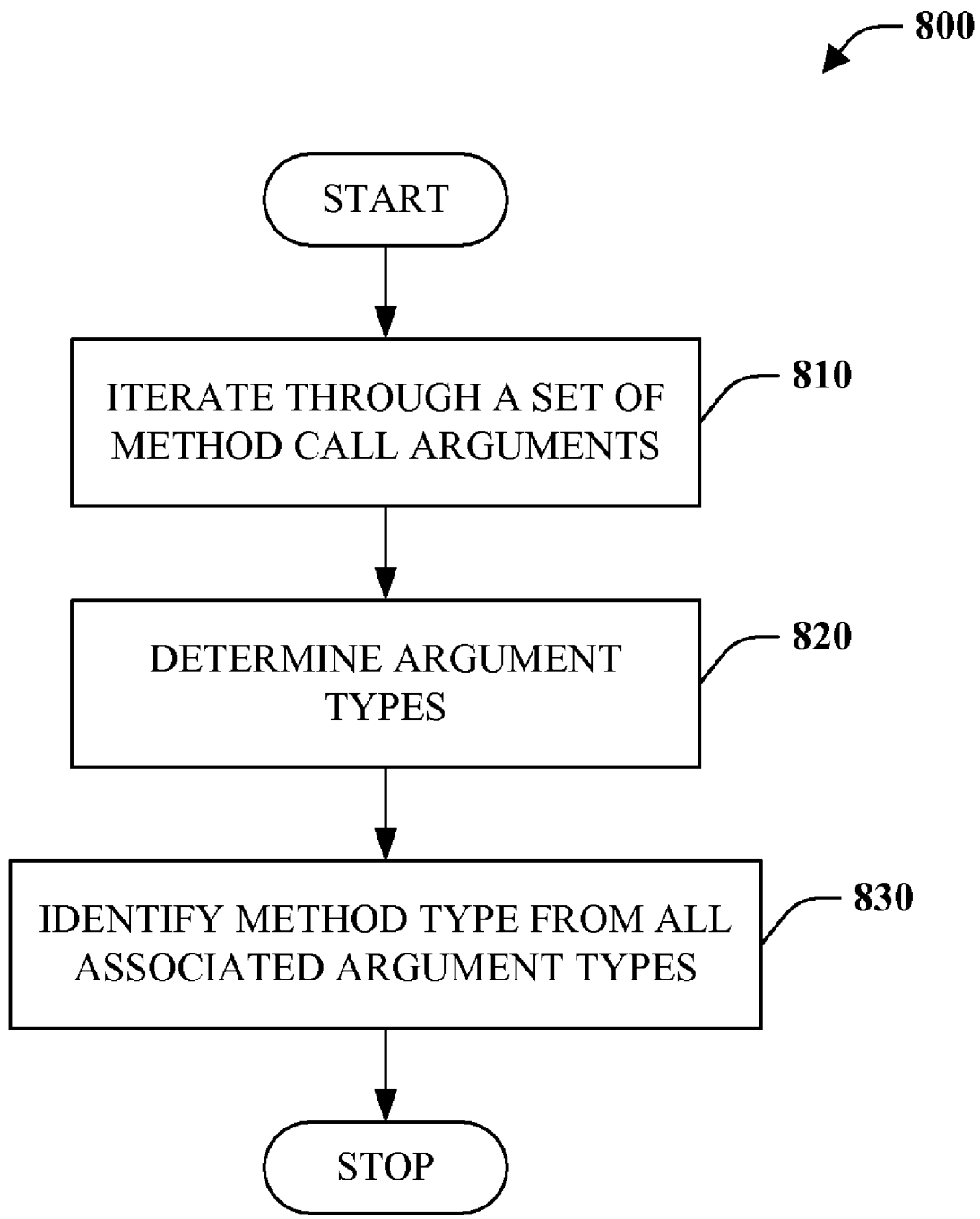
FIG. 8 is a flow chart diagram of an iterative type inference method.

FIG. 8 depicts an iterative type inference method 800 in accordance with an aspect of the claimed subject matter. At reference numeral, 810, a set of method arguments are iterated through. Argument types are determined at reference 820. In particular, an attempt can be made to determine an argument type at each iteration. If type cannot be determined at that point, type inference is postponed for that argument and the next type is analyzed. In this manner, additional information can be collected and subsequently employed to enable a previously undetermined type to be determined. At reference numeral 830, a method type argument is determined from one or more associated argument or parameter types in one of a myriad of manners previously described.

Figure 9:
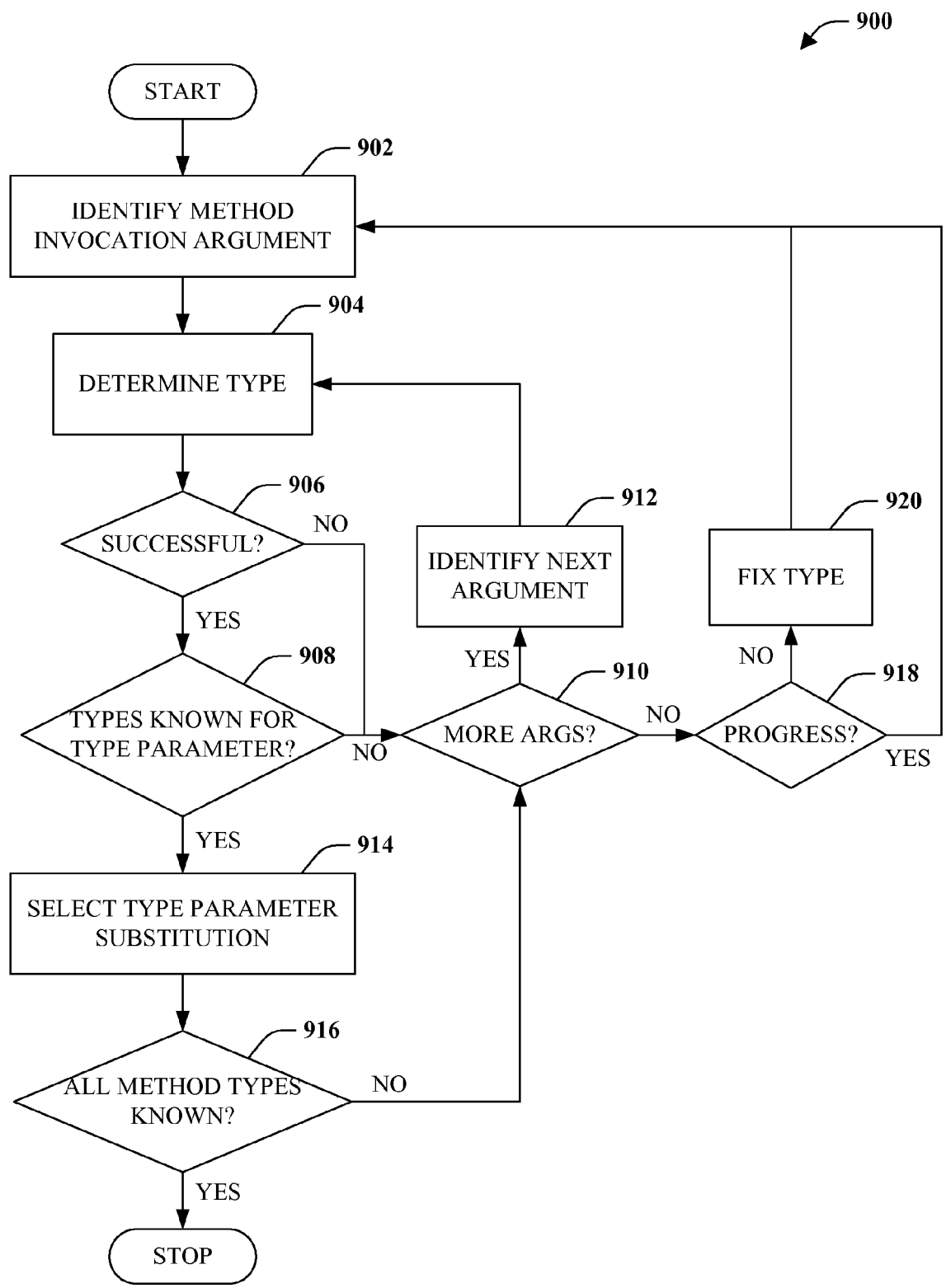
FIG. 9 is a flow chart diagram of an incremental type inference method.

Referring to FIG. 9 an incremental type inference method 900 is illustrated in further detail in accordance with an aspect of the claimed subject matter. At reference numeral 910, a method argument or parameter is identified. An attempt is made at 920 to determine the type of the identified method argument (or types of a lambda expression, anonymous function . . . ). At numeral 930, a determination is made as to whether a type was able to be determined successfully or not. If a type was not able to be determined, the method continues at numeral 910. Otherwise, the method proceeds to numeral 914.

At numeral 910, a determination is made as to whether there are any arguments yet to be analyzed during the particular iteration. If yes, the method identifies the next argument at 920 and attempts to determine the type at numeral 904. This effectively allows a type to be skipped or type inference postponed so that further information may be acquired from other arguments that may be utilized to identify a type yet to be determined for example where one or more type dependencies exists. If all arguments have been seen, the method continues at 918 where a determination as to whether progress can be made. If yes, the method continues back to 910 to reiterate the set of arguments. At this point, types can or may be fixed from previous iterations such that progress can be made where not possible in the previous iteration. If no, one or more types can be first fixed at 920 and then the method proceeds to 910. Fixing a type can enable it to be utilized with respect to subsequent argument inference. It should be appreciated that the method can also fail after many iterations with no progress.

At numeral 908, a determination is made concerning whether all types are known for a type parameter. If no, the method continues at 910 as described supra. If yes, the method moves to reference numeral 914 where a type or type substitution is determined from one or more type parameters. At numeral 916, a question is posed concerning whether all method types are known. If all types are known, the method can simply terminate successfully. Otherwise, the method can continue at reference 910.

Figure 10:
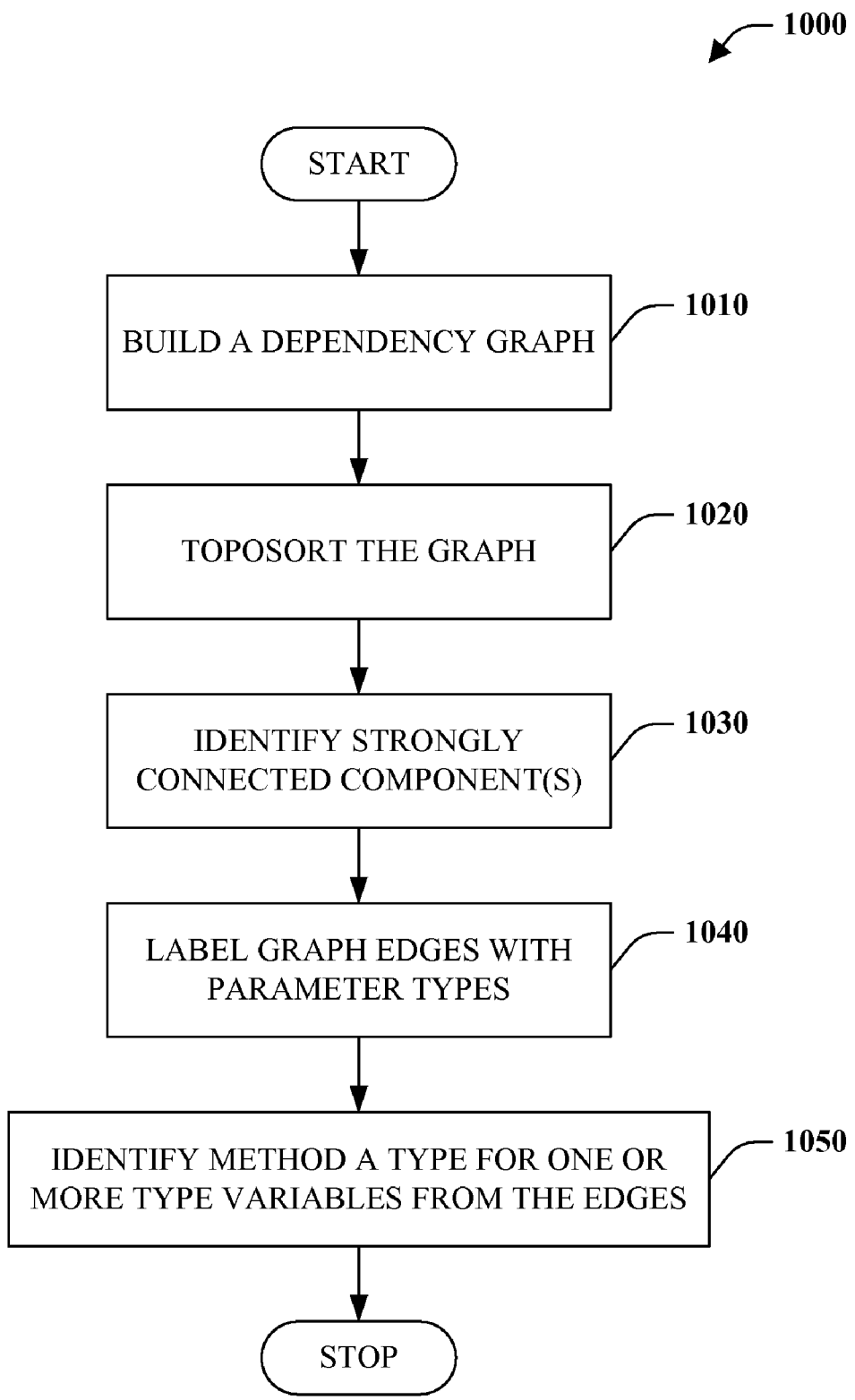
FIG. 10 is a flow chart diagram of a type inference method employing a dependency graph.

FIG. 10 depicts a type inference method 1000 that employs a dependency graph. As previously described, a dependency graph is an efficient mechanism to implement incremental type inference. At reference numeral 1010, a dependency graph is built or generated as a function of a method declaration. In particular, the graph can include a plurality of nodes representative of arguments, type parameters and their dependency. At numeral 1020, a topological sort or toposort is performed to arrange the graph or elements thereof in more efficient form. Strongly connected components are identified at 1030. Strongly connected components can be single nodes by default or a set of nodes that define a cycle. At reference numeral 1040, edges are labeled with determined argument/parameter types. A type or substitution for at least one type variable is identified or determined at numeral 1050 as a function of one or more incoming edges. If there is only one incoming edge, the type associated therewith can be fixed as a type parameter type or type argument. Alternatively, a type to which other types can be converted can be identified, among other things.

An example is now provided with respect to FIGS. 11*a-e* to facilitate clarity with the use of a dependency graph for type inference. Consider the following function and call:

```
Sub Foo(Of T, 5, R)( _
    a1 As T, _
    a2 As T, _
    a3 As Func(Of T, S), _
    a4 As Func(Of 5, R( )), _
    a5 As Func(Of R, S))
End Sub
```

-continued

```
Foo( _
    1, _
    1L, _
    Function(x) x > 0, _
    Function (b) new int( ) { iif(b, 1, 0)},
    Function(z As Long) z  2)
```

Figure 11A:
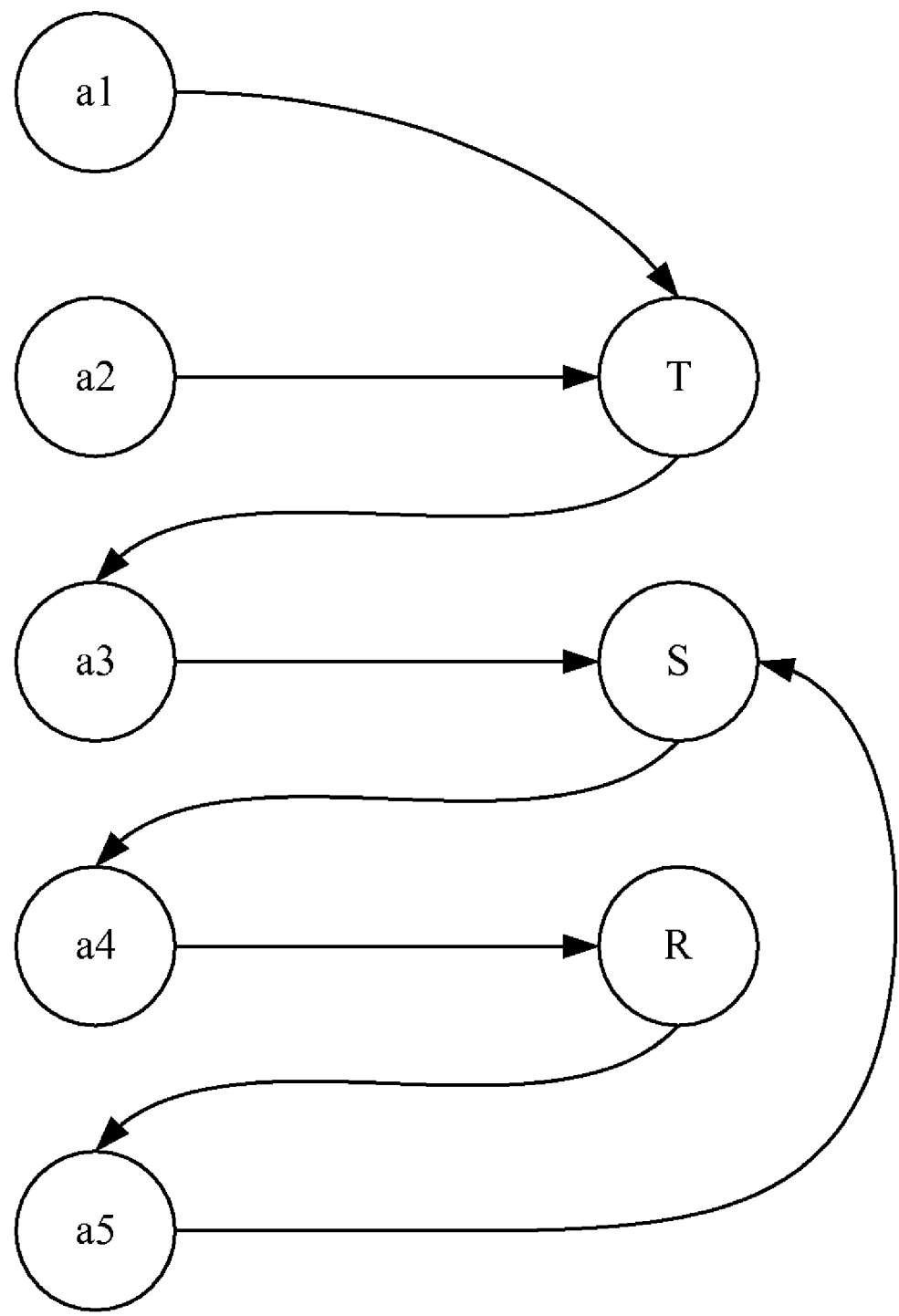
FIGS. 11a-e illustrate representative dependency graphs in associated with an exemplary scenario.
Figure 11B:
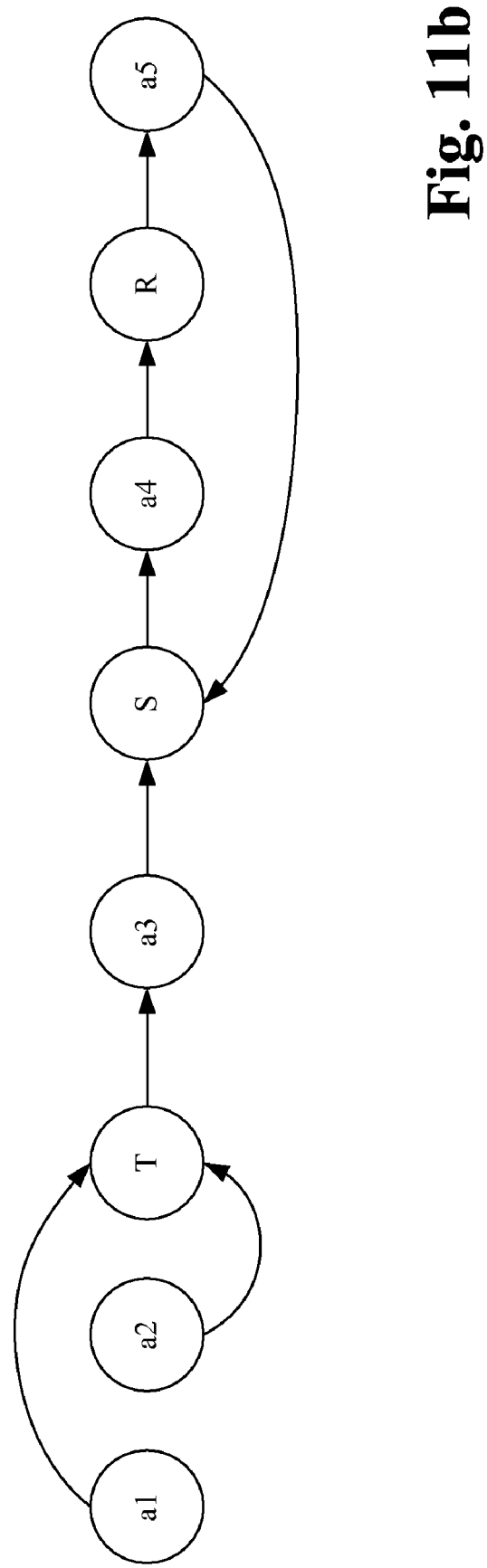
Figure 11C:
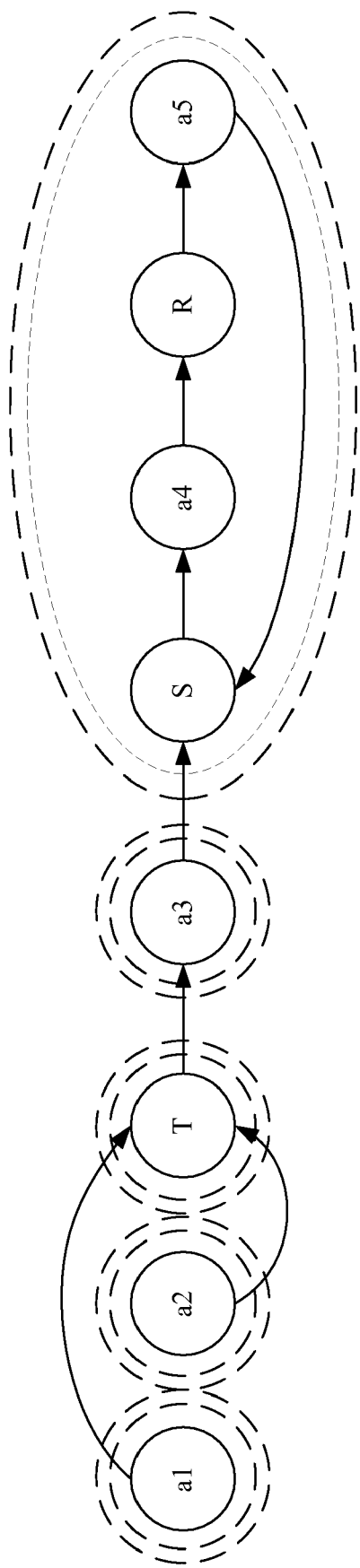

First, a dependency graph can be built for the function by stepping through the arguments a1-a5 and identifying dependencies with respect to type variables T, S and R. FIG. 11*a* illustrates the dependency graph for the subject function. Next, the graph is topographically sorted as shown in FIG. 11*b* to facilitate analysis. Then, strongly connected components are identified. As depicted in FIG. 11*c*, the strongly connected components include S, a4, R and a5 that define a cycle. All others elements are strongly typed themselves by default, for example.

Figure 11D:
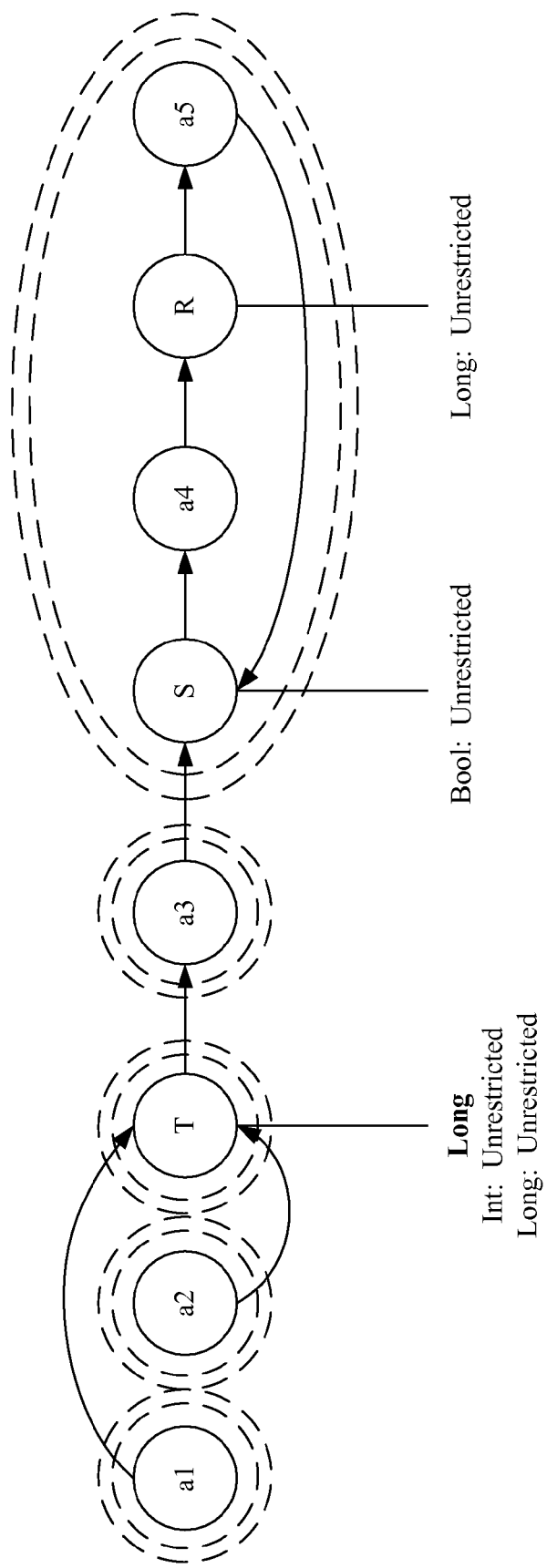

Types can next be associated with graph nodes utilizing the call and/or declaration as depicted by FIG. 11*d*. First, note an explicit type long is specified with respect to the lambda expression argument of argument a5. Accordingly, R can be noted as type long. Next, the process can proceed iteratively from left to right.

As per a1 and a2, all inputs are considered known since there are none. For a1, the parameter type can be inferred as integer without restriction from the value "1." The parameter type of a2 can be inferred or otherwise determined to be long unrestricted from the argument "11." This type information can be propagated upon determination to dependent type variable T.

Type variable T can now be determined and fixed since all its inputs are known. In particular, the inputs are int unrestricted and long unrestricted from a1 and a2, respectively. Since there are multiple types, a dominate type algorithm can be executed to identify the type of T from the set of int and long. Long can be selected as int can be converted to long. A partial binding can then be built noting that T maps to long.

Turning attention to a3, the argument is a lambda expression that receives a type T and produces a type S. The resulting type can now be interpreted in light of the partial binding of T to long. The result is that a3 produces an output S of type Boolean-unrestricted. This information can now be propagated to type variable S.

At this point, however, a strongly connected component with more than one node is encountered. This implies a cycle. For all nodes that have incoming edges into the strongly connected component, the type is pinned. Here, S has its type pinned as Boolean. Next an assertion can be made to remove the cyclic edge from a5 to S, namely a5→S. The algorithm is now restarted since an edge has been removed.

Figure 11E:
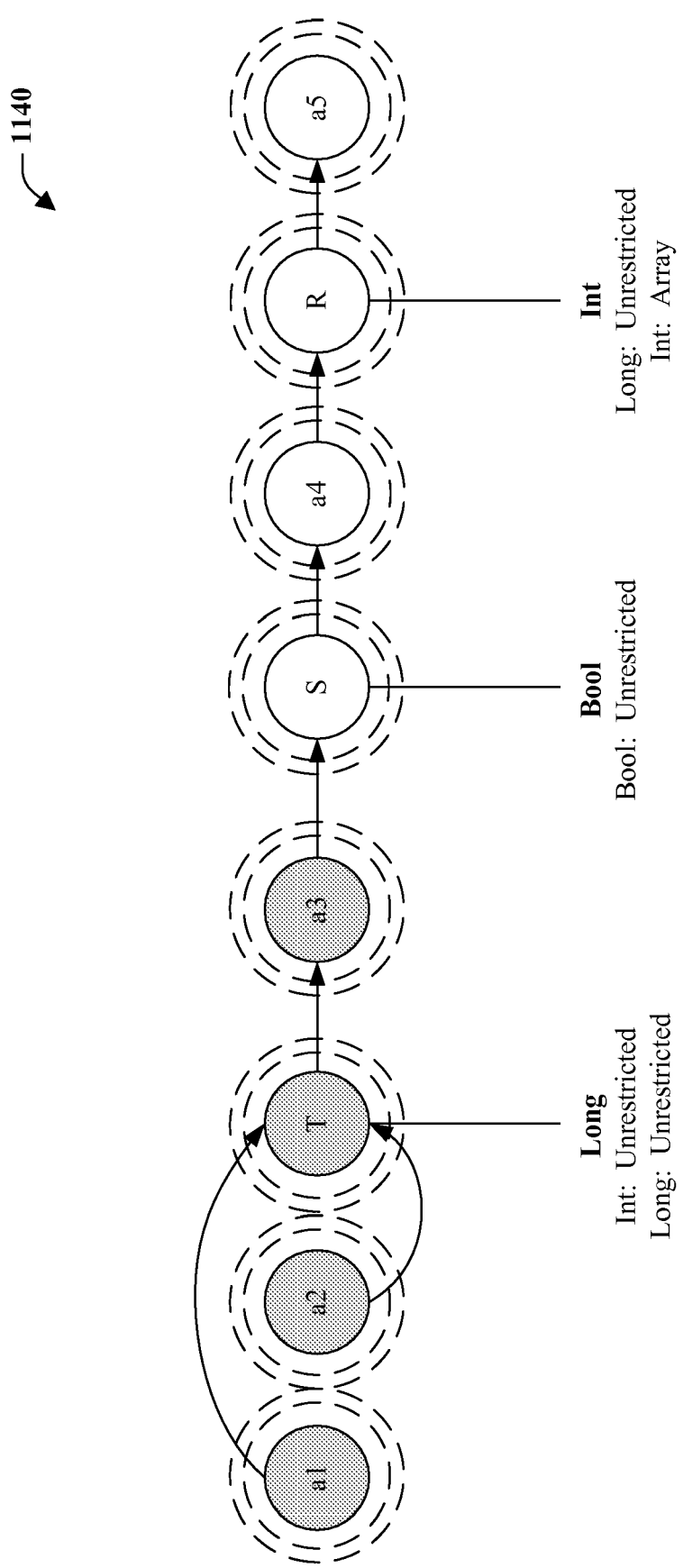

The dependency graph of FIG. 11*e* results after toposort and identification of strongly coupled components. The method can skip the gray nodes already inferred and continue with S. Since all incoming edges are known, namely just one Boolean, the type Bool can be inferred or determined for S.

Moving to a4, all incoming edges are known. A partial binding or type list mapping S to Bool can be created and utilized to interpret the body of a4. Here, a4 takes a Bool and returns an array of integers. An annotation can now be added to R marking this int as requiring array covariance.

R can know be determined, since all input data is known. In particular, there are two types associated with R, namely long: unrestricted and int: Array covariance. Here, method type variable can be inferred as type int.

All incoming data for a5 is known, so its type can be determined. A partial type list can be built that maps R to Int. Now, the body of the lambda can be interpreted. Since the lambda expression has an explicit type specified, namely long, the inferred type need not be pushed down. Accordingly, the result is long. Relaxation can be generated to convert the inferred int of R to long of the lambda.

All inference is complete, so the assertions should be verified. S was inferred as Boolean and a5 returns a long. If this conversion is valid, type inference succeeds with Long, Bool and Int. Otherwise, type inference fails.

It should be noted that aspects of the disclosed subject matter are applicable to generics generally including methods, classes, types and the like. However, solely for purposes of clarity and understanding, the above has been described in large part with respect to generic methods and method invocations. It is to be appreciated that the subject matter is equally applicable to classes, types, interfaces, delegates and instantiations thereof, among other things. Moreover, the subject matter is generally applicable to type inference and not limited to employment with generics.

Note also that the type inference systems and methods described supra are not limited to solely providing omitted types during compilation. Such mechanisms can also be utilized to aid programmers at design time. More specifically, the disclosed type inference can be utilized within an integrated design environment (IDE) to facilitate identification errors and/or provide intelligent assistance (e.g., autocompletion, hints, suggestions . . . ), among other things.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 12:
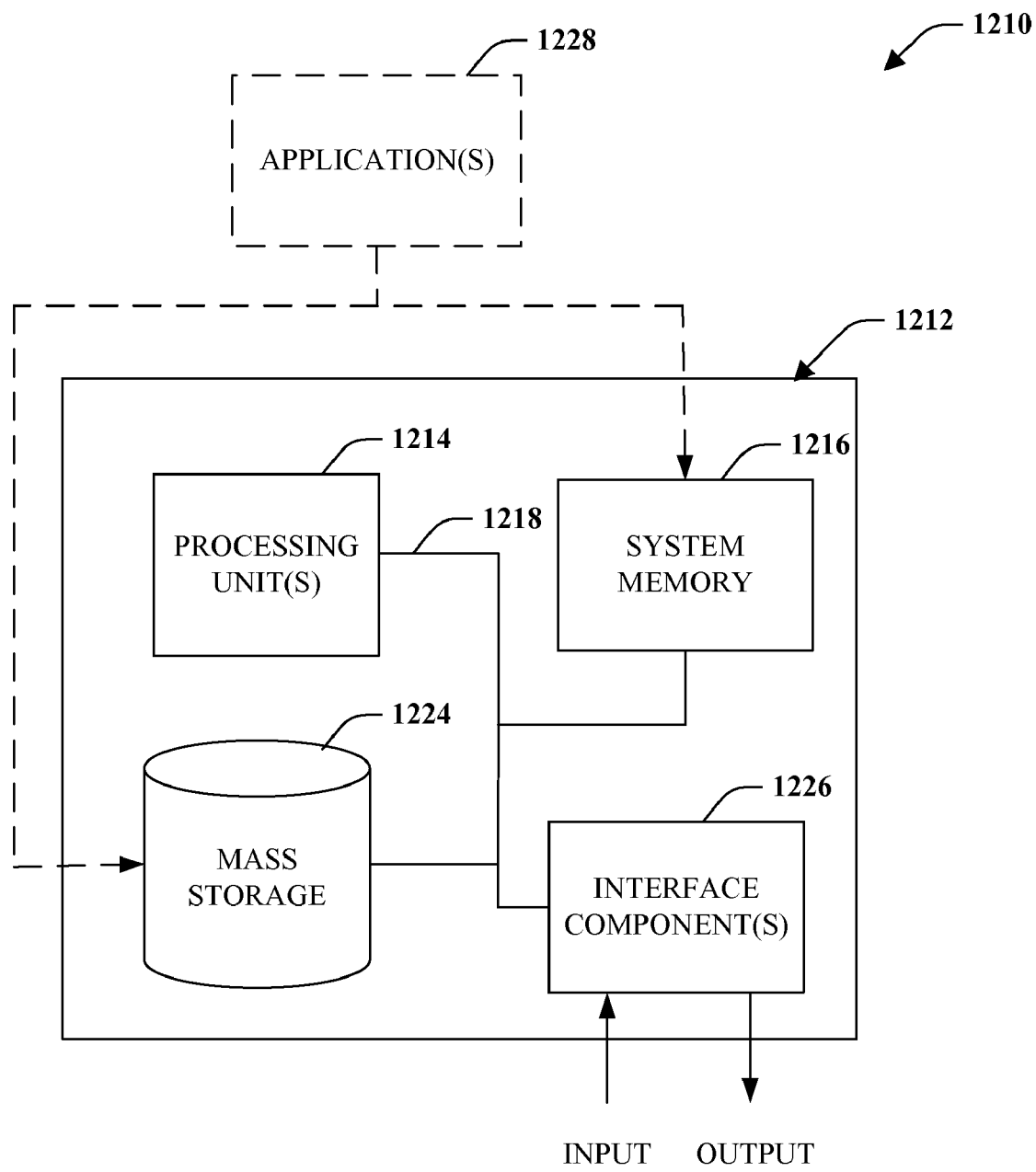
FIG. 12 is a schematic block diagram illustrating a suitable operating environment for aspects of the subject disclosure.
Figure 13:
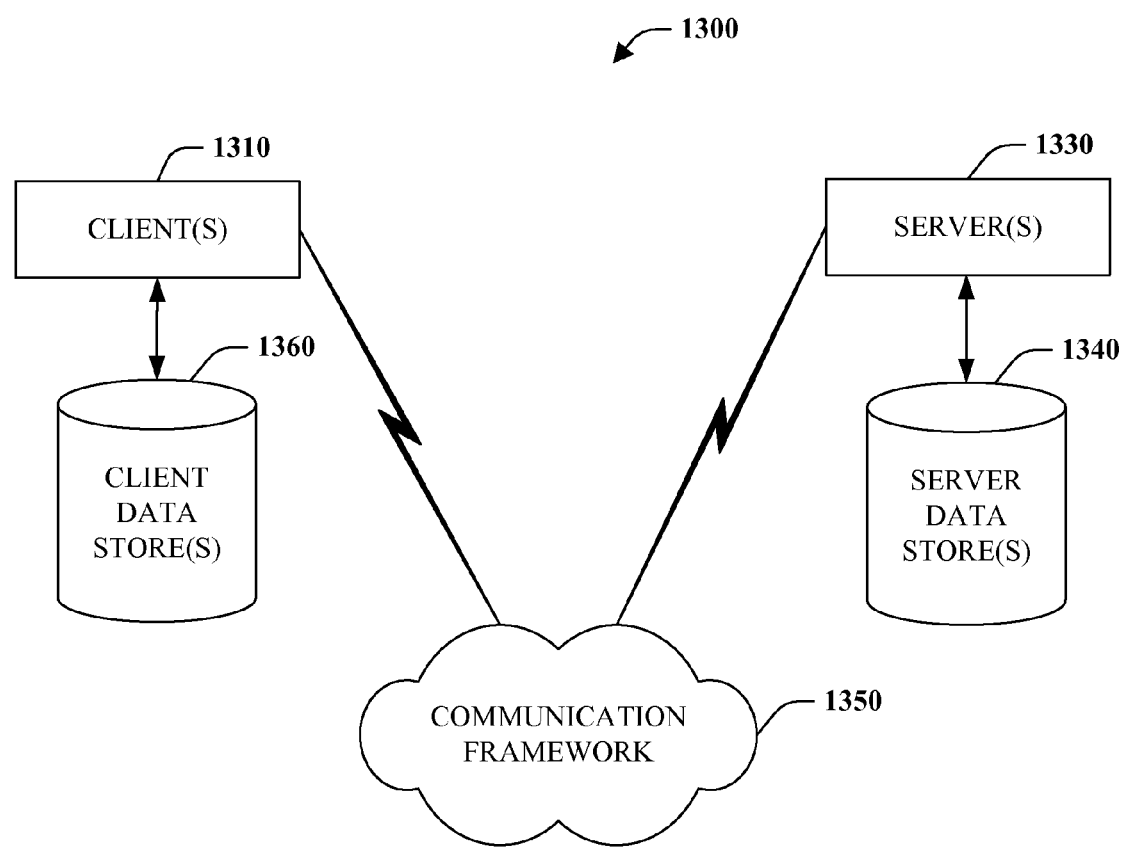
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216 and a system bus 1218. The system bus 1218 couples system components including, but not limited to, the system memory 1216 to the processing unit 1214. The processing unit 1214 can be any of various available microprocessors. It is to be appreciated that dual microprocessors, multi-core and other multiprocessor architectures can be employed as the processing unit 1214.

The system memory 1216 includes volatile and nonvolatile memory. The basic input/output system (BIOS), containing the basic routines to transfer information between elements within the computer 1212, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1212 also includes removable/non-removable, volatile/non-volatile computer storage media. FIG. 12 illustrates, for example, mass storage 1224. Mass storage 1224 includes, but is not limited to, devices like a magnetic or optical disk drive, floppy disk drive, flash memory or memory stick. In addition, mass storage 1224 can include storage media separately or in combination with other storage media.

FIG. 12 provides software application(s) 1228 that act as an intermediary between users and/or other computers and the basic computer resources described in suitable operating environment 1210. Such software application(s) 1228 include one or both of system and application software. System software can include an operating system, which can be stored on mass storage 1224, that acts to control and allocate resources of the computer system 1212. Application software takes advantage of the management of resources by system software through program modules and data stored on either or both of system memory 1216 and mass storage 1224.

The computer 1212 also includes one or more interface components 1226 that are communicatively coupled to the bus 1218 and facilitate interaction with the computer 1212. By way of example, the interface component 1226 can be a port (e.g., serial, parallel, PCMCIA, USB, FireWire . . . ) or an interface card (e.g., sound, video, network . . . ) or the like. The interface component 1226 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1212 to output device(s) via interface component 1226. Output devices can include displays (e.g., CRT, LCD, plasma . . . ), speakers, printers and other computers, among other things.

FIG. 13 is a schematic block diagram of a sample-computing environment 1300 with which the subject innovation can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the aspects of the subject innovation, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s)

1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330. For example, programmers can design programs on client(s) 1310 and provide them via communication framework 1350 to server(s) 1330 for compilation or vice versa. Additionally or alternatively, all or a portion of the type inference functionality can be transmitted between client(s) 1310 and server(s) 1330 as part of an application or upgrade for an existing application.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A type inference system for selecting a specific method invocation when a generic method is specified in program code, the system comprising:
    a processor; and
    memory storing computer executable instructions which when executed by the processor perform the following:
        receive program code that invokes a generic method without specifying the type of each of a plurality of input parameters of the generic method;
        analyze each of the plurality of input parameters to infer a candidate set of types to which the input parameters could be resolved;
        determine that a first input parameter's type could be resolved to a plurality of different types;
        after inferring the type of the other one or more input parameters, determine that the first input parameter's type could still be resolved to two or more different types based on the inferred type of the other one or more input parameters;
        determine a method return type specified in the generic method invocation,
        infer the first input parameter's type based on the inferred type of one or more of the other input parameters and based on the return type specified in the generic method invocation, wherein the type of the first parameter is inferred such that the set of inferred types for the plurality of parameters is valid for one of the specific method invocations pertaining to the generic method and such that the valid specific method invocation has a return type that matches the return type specified in the generic method; and
        select the valid specific method invocation to be used in the program code in place of the generic method invocation.

2. The system of claim 1, wherein the computer executable instructions further perform the following:
    annotate the input parameters with conversion restrictions to be used in inferring the type of each input parameter.

3. The system of claim 2, wherein the restrictions are program language specific.

4. The system of claim 3, wherein the restrictions are programmer specified.

5. The system of claim 2, wherein the restrictions depend on positioning of the parameter with respect to a constructed type.

6. The system of claim 1, wherein at least one of the input parameters is a lambda expression.

7. The system of claim 1, wherein one or more of the input parameters are explicitly typed.

8. The system of claim 1, wherein the types are inferred iteratively.

9. The system of claim 8, wherein the computer executable instructions further perform the following:

fixing the type of an input parameter to expedite computation in the presence of a cyclic type dependency.

10. A type inference method performed by a computer for selecting a specific method invocation when a generic method is specified in program code, the method comprising:

receiving program code that invokes a generic method without specifying the type of each of a plurality of input parameters of the generic method;

analyzing each of the plurality of input parameters to infer a candidate set of types to which the input parameters could be resolved;

determining that a first input parameter's type could be resolved to a plurality of different types;

after inferring the type of the other one or more input parameters, determine that the first input parameter's type could still be resolved to two or more different types based on the inferred type of the other one or more input parameters;

determining a method return type specified in the generic method invocation;

inferring the first input parameter's type based on the inferred type of one or more of the other input parameters and based on the return type specified in the generic method invocation, wherein the type of the first parameter is inferred such that the set of inferred types for the plurality of parameters is valid for one of the specific method invocations pertaining to the generic method and such that the valid specific method invocation has a return type that matches the return type specified in the generic method; and selecting the valid specific method invocation to be used in the program code in place of the generic method invocation.

11. The method of claim 10, wherein the type of at least one of the other one or more input parameters is fixed to enable the inference of the type of the other one or more input parameters.

12. The method of claim 10, further comprising restricting allowable inferences as a function of input parameter position with respect to a constructed type.

13. The method of claim 10, wherein the types of the input parameters are inferred by building a dependency graph.

* * * * *